(12) United States Patent
Kohmyohji et al.

(10) Patent No.: US 11,293,583 B2
(45) Date of Patent: Apr. 5, 2022

(54) HEAT-INSULATION MATERIAL, HEAT-INSULATION STRUCTURE USING SAME, AND PROCESS FOR PRODUCING SAME

(71) Applicant: Panasonic Intellectual Property Management Co., Ltd., Osaka (JP)

(72) Inventors: Daido Kohmyohji, Nara (JP); Kazuma Oikawa, Osaka (JP); Takashi Tsuruta, Osaka (JP); Tooru Wada, Osaka (JP); Shigeaki Sakatani, Osaka (JP); Hidenori Miyakawa, Hokkaido (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 459 days.

(21) Appl. No.: 15/897,037

(22) Filed: Feb. 14, 2018

(65) Prior Publication Data

US 2018/0245731 A1 Aug. 30, 2018

(30) Foreign Application Priority Data

Feb. 28, 2017 (JP) .............................. JP2017-036238

(51) Int. Cl.
*F16L 59/02* (2006.01)
*B32B 9/04* (2006.01)
(Continued)

(52) U.S. Cl.
CPC ............ *F16L 59/029* (2013.01); *B32B 9/047* (2013.01); *B32B 17/02* (2013.01); *F16L 59/026* (2013.01);
(Continued)

(58) Field of Classification Search
CPC ..... B32B 9/047; B32B 2307/304; B32B 7/05; B32B 2260/021; B32B 17/02; B32B 5/26;
(Continued)

(56) References Cited

U.S. PATENT DOCUMENTS

2009/0029109 A1* 1/2009 Seth .................. B32B 5/022
428/158
2012/0073693 A1* 3/2012 Collier .................. F16L 59/22
138/103
(Continued)

FOREIGN PATENT DOCUMENTS

CN 102649329 A 8/2012
CN 104712884 A 6/2015
(Continued)

OTHER PUBLICATIONS

English Translation of Chinese Search Report dated Jan. 19, 2021 for the related Chinese Patent Application No. 201810154584.6.

*Primary Examiner* — Maria V Ewald
*Assistant Examiner* — Daniel P Dillon
(74) *Attorney, Agent, or Firm* — McDermott Will & Emery LLP

(57) ABSTRACT

Heat-insulation materials that can be placed along the lines of heat sources, heat-insulation structures using the same, and processes for producing the same. A heat-insulation material, that includes: fiber sheets that each have fibers and an aerogel and that have different sizes; and at least one covering material that covers the fiber sheets, or at least one elastic material that includes the fiber sheets. The at least one covering material may include a first covering material and a second covering material.

2 Claims, 6 Drawing Sheets

(51) Int. Cl.
  *B32B 17/02* (2006.01)
  *F16L 59/10* (2006.01)
  *F16L 59/06* (2006.01)

(52) U.S. Cl.
  CPC .............. *F16L 59/028* (2013.01); *F16L 59/06* (2013.01); *F16L 59/10* (2013.01); *B32B 2260/021* (2013.01); *B32B 2305/026* (2013.01); *B32B 2307/304* (2013.01)

(58) Field of Classification Search
  CPC ................ B32B 2305/026; F16L 59/00; F16L 59/026–029
  See application file for complete search history.

(56) References Cited

U.S. PATENT DOCUMENTS

| | | | | |
|---|---|---|---|---|
| 2013/0065011 | A1* | 3/2013 | Suzuki | ................ H01L 23/3737 428/77 |
| 2016/0016378 | A1 | 1/2016 | Oikawa et al. | |
| 2016/0185068 | A1* | 6/2016 | Shinohara | ............. F16L 59/065 156/60 |
| 2017/0266920 | A1* | 9/2017 | Oikawa | .................. F16L 59/028 |
| 2018/0079944 | A1* | 3/2018 | Trifu | ...................... C08J 9/0061 |
| 2018/0290118 | A1* | 10/2018 | Sakaguchi | ........... B01J 13/0091 |

FOREIGN PATENT DOCUMENTS

| | | | |
|---|---|---|---|
| JP | 2009-299893 | A | 12/2009 |
| JP | 2011-174602 | A | 9/2011 |
| JP | 2014-035044 | A | 2/2014 |
| JP | 2015-113924 | A | 6/2015 |
| JP | 2016-028880 | | 3/2016 |
| JP | 6064149 | B | 1/2017 |
| WO | WO-2016157784 | A1 * | 10/2016 ............. B32B 37/14 |

* cited by examiner

HEAT-INSULATION MATERIAL, HEAT-INSULATION STRUCTURE USING SAME, AND PROCESS FOR PRODUCING SAME

TECHNICAL FIELD

The technical field relates to heat-insulation materials, heat-insulation structures using the same, and processes for producing the same.

BACKGROUND

As one example of an excellent heat-insulation material, a heat-insulation sheet using an aerogel can be mentioned (JP-A-2016-28880).

The above-mentioned heat-insulation material is produced by including an aerogel inside a fiber sheet.

SUMMARY

However, when such a heat-insulation sheet 100 is disposed around a heat source 110, a structure shown in FIG. 1 is formed.

FIG. 1 is a cross-section view of a heat-insulation structure 112 using the conventional heat-insulation sheet 100.

As observed in FIG. 1, when the heat-insulation sheet 100 is formed in a sheet shape, spaces 102 are formed between the heat-insulation sheet 100 and the heat source 110 around corners of the heat source 110. The spaces 102 have shape of a rectangular parallelepiped.

Since such spaces 102 cause penetration and release of heat, the heat-insulation sheet 100 delivers inferior heat-insulation performance.

Thus, an object of the disclosure is to provide heat-insulation materials that can be placed along the lines of heat sources, heat-insulation structures using the same, and processes for producing the same.

In order to achieve the above-mentioned object, according to a first aspect of the disclosure, provided is a heat-insulation material, including: fiber sheets that each have fibers and an aerogel and that have different sizes; and at least one covering material that covers the fiber sheets, or at least one elastic material that includes the fiber sheets.

Moreover, according to a second aspect of the disclosure, provided is a heat-insulation structure, including: a heat source; and a heat-insulation material that is placed around the heat source, wherein the heat-insulation material includes: fiber sheets that each have fibers and an aerogel and that have different sizes; and at least one covering material that covers the fiber sheets, or at least one elastic material that includes the fiber sheets.

Furthermore, according to a third aspect of the disclosure, provided is a process for producing a heat-insulation material, including: (i) providing small pieces of fiber sheets that each include fibers and an aerogel and that have different sizes; and (ii) covering the small pieces of fiber sheets with at least one covering material to produce the heat-insulation material.

According to the disclosure, the resulting heat-insulation materials can be placed along the lines of solid or tridimensional objects, and therefore, any spaces through which heat will be released to the outside are not formed. As a result, structures using the heat-insulation materials deliver high heat-insulation performance.

DESCRIPTION OF EMBODIMENTS

Hereinafter, embodiments of the disclosure will be described with reference to the drawings.

First Embodiment

A heat-insulation structure 12 according to the first embodiment will be described with reference to FIGS. 2A-2D.

Figure 2A:
FIGS. 2A-2C are cross-section views for describing steps for production of a heat-insulation material according to a first embodiment.
Figure 2B:
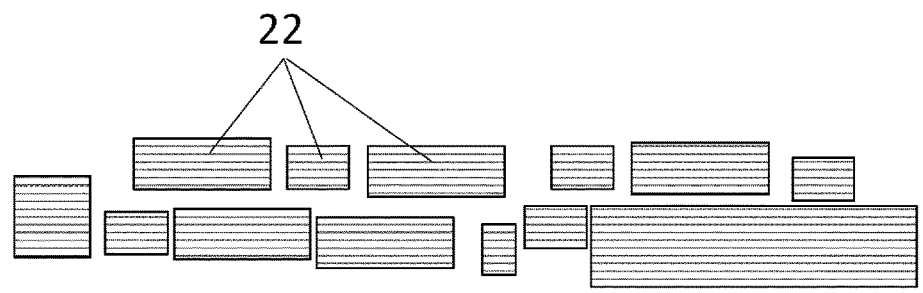
Figure 2C:
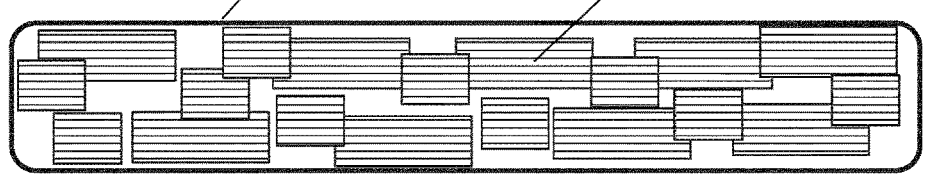

FIGS. 2A-2C describes a process for producing a heat insulation material 10a according to the first embodiment.

Figure 2D:
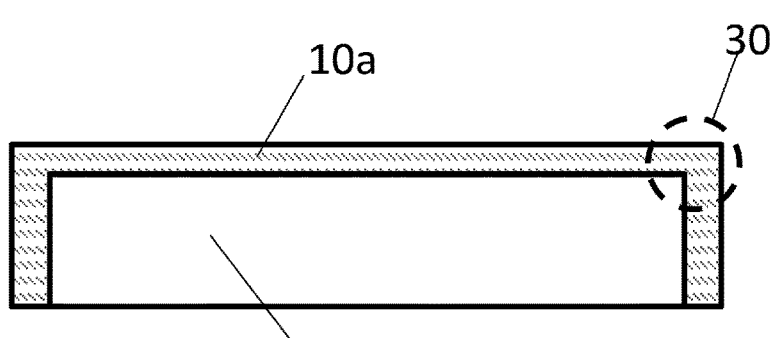
FIG. 2D is a cross-section view of a heat-insulation structure according to the first embodiment.

FIG. 2D refers to a heat-insulation structure 12 in which the heat-insulation material 10a is applied to a heat source 110.

FIG. 2A is a cross-section view of a fiber sheet 26 including an aerogel.

A sol solution that is converted to the aerogel is coated onto a fiber sheet 26. Then, the sol solution is gelatinized, aged, hydrophobized and dried to produce the fiber sheet 26. The details will be described below.

FIG. 2B refers to small fiber sheets 22 obtained by crushing the fiber sheet 26 shown in FIG. 2A.

With regard to dimensions of fiber sheets 22, for example, the thickness may be from about 0.1 mm about 2 mm, and the lengths in the planar direction may be from about 5 mm to about 20 mm.

The dimensions may not be homogeneous and may preferably show a certain degree of distribution.

This is because, in such a case, it becomes possible to layer fiber sheets 22 tightly.

With regard to variations in the sizes, for example, the longest side of the largest fiber sheet 22 is about one to about one hundred times larger than that of the smallest fiber sheet 22.

Moreover, shapes of the fiber sheets 22 are preferably rectangular.

Furthermore, the fiber sheets 22 may include square fiber sheets.

FIG. 2C refers to a heat-insulation material 10a according to the first embodiment.

In the heat-insulation material 10a, multiple fiber sheets 22 are covered with a covering material 21.

The covering material 21 may be a flexible sheet made of PET (polyethylene terephthalate) or the like.

A thickness of the covering material 21 is preferably from 0.05 mm to 0.20 mm.

In addition, instead of a sheet material, the fiber sheets 22 may be coated with a solution to form the heat-insulation material 10a.

The same shall apply to examples described below.

Additionally, the fiber sheets 22 are preferably entirely covered with the covering material 21.

However, only top and bottom sides of the assembly of the fiber sheets 22 may be covered with the covering material 21. Alternatively, a part of the assembly of the fiber sheets 22 may be covered with the covering material 21.

The same shall apply to examples described below.

A material employed for the covering material 21 would depend on a temperature range where the heat-insulation material is used.

When the maximum temperature is 80° C., PET would be employed therefor. When the maximum temperature is 200° C., polyimide sheets may be employed therefor. When the maximum temperature exceeds 200° C., fluororesin sheets, glass fabrics, and the like may be employed therefor.

The fiber sheets 22 are formed in the shapes of sheets, and preferably form a layer structure including at least three layers within the heat-insulation material 10a.

This is because, if regions in which any fiber sheets 22 are not present are formed in the heat-insulation material 10a when the heat-insulation material 10a is viewed from the planar direction, heat would be released therefrom.

FIG. 2D shows the heat-insulation structure 112 according to the first embodiment.

The heat-insulation structure 112 is formed by enclosure of the heat source 110 with the heat-insulation material 10a.

Corners 30 of the heat source 110 will tightly be covered with the heat-insulation material 10a.

Figure 1:
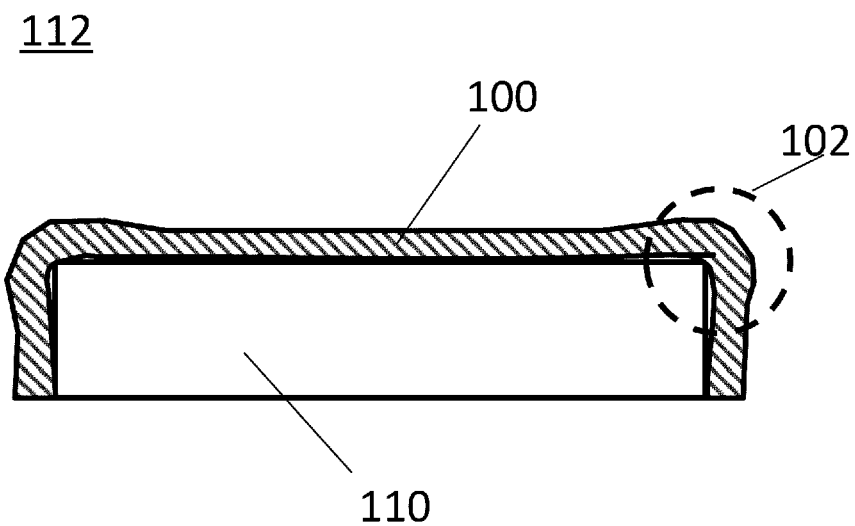
FIG. 1 is a cross-section view of a heat-insulation structure using a heat-insulation material disclosed in JP-A-2016-28880.

Since any space 102 (as found in FIG. 1) are not present therein, any heat will not be released therefrom.

Inside the heat-insulation material 10a, the fiber sheets 22 can relatively be moved, and thus, the heat-insulation material 10a will easily be bent around the corners 30.

Figure 3A:
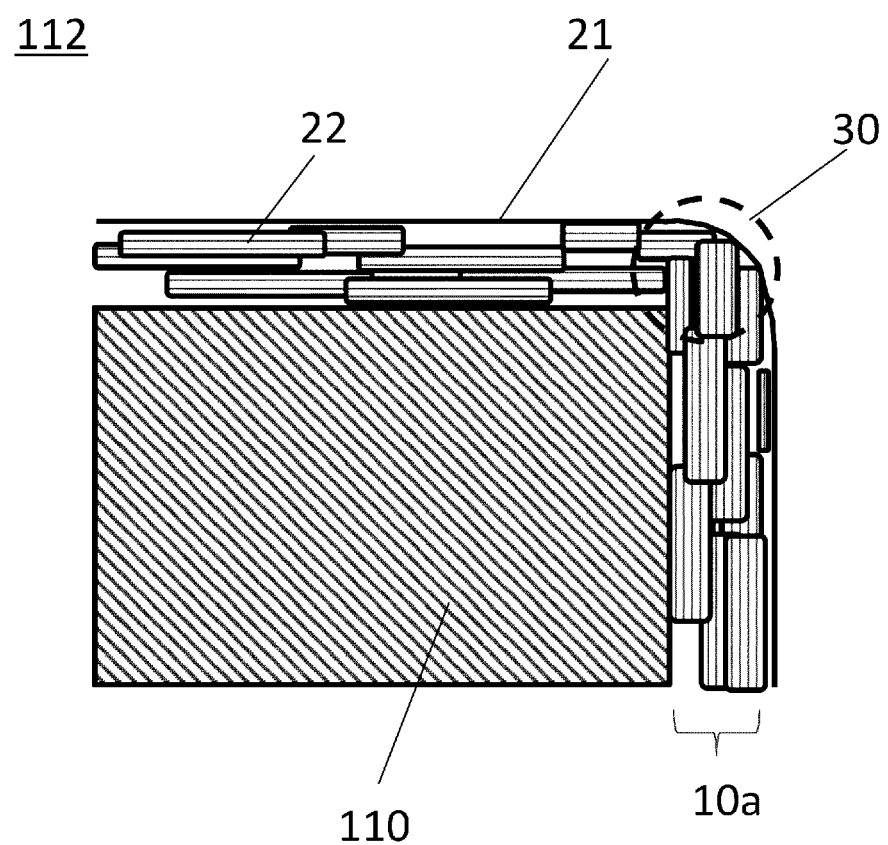
FIGS. 3A and 3B are enlarged cross-section views of corners of the heat-insulation structure according to the first embodiment.

FIG. 3A is an enlarged cross-section view of one of the corners 30 of the heat-insulation structure 112.

Around the corner 30, fiber sheets 22 will be arrayed in parallel with external surfaces of the heat source 110.

Accordingly, it becomes possible to adhere the heat-insulation material 10a tightly against the heat source 110.

Additionally, preferably, the fiber sheet 22 are arrayed in parallel with all of the surfaces of the heat source 110. However, the fiber sheet 22 may be arrayed in parallel with only one surface of the heat source 110.

Figure 3B:
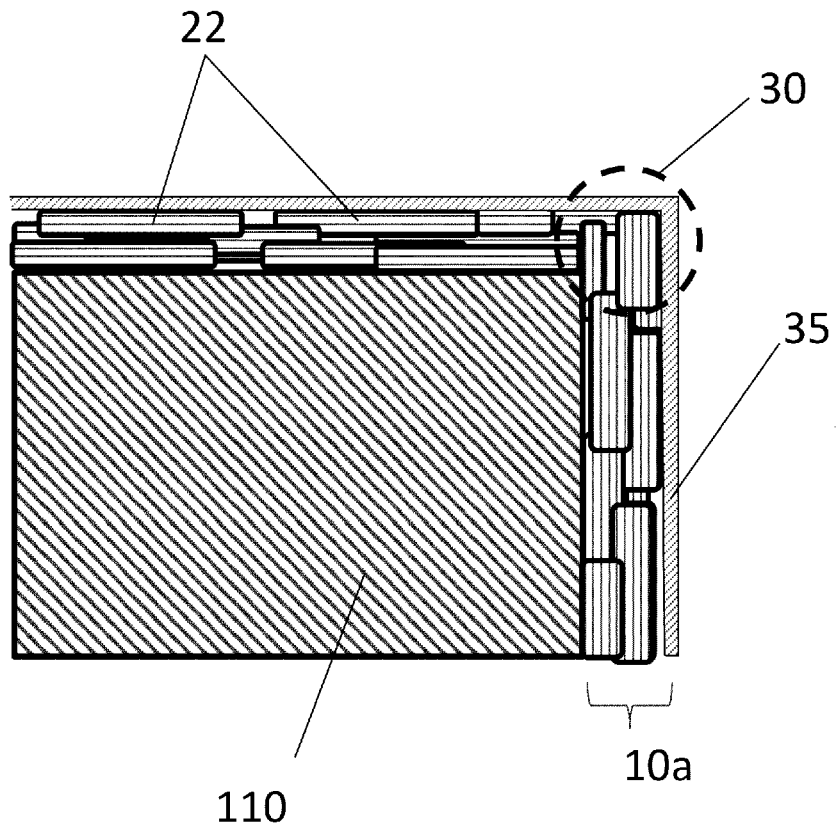

In addition, as shown in FIG. 3B, a guide 35 is preferably provided with respect to the heat-insulation structure 112 in FIG. 3A.

The guide 35 serves as a member for more rigidly pushing the heat-insulation material 10a against the heat source 111.

The guide 35 is a plate-shaped cover that has almost the same shape as the external shape of the heat source 110, so as to cover the outside the heat source 110.

The guide 35 is preferably made of a metal material that is resistant to heat.

The heat-insulation material 10a is pushed against the heat source 110 by the guide 35, and thus, is compressed so as to tightly adhere to the heat source 110.

As a result, the heat-insulation performance will be improved.

<Process for Producing a Heat-Insulation Material 10a>
(i) Materials

As a starting material for production of a silica aerogel, water glass (silicate soda aqueous solution) is employed. Preparation of the silica aerogel can be controlled by adjusting the concentration of silicates in the water glass, the type of acid used for the gelatinization, and gelatinization conditions (temperature, time and pH).

The concentration of silicate in the water glass may be adjusted such that the weight of silica is from 5 wt % to 20 wt %, preferably from 10 wt % to 20 wt %, more preferably 15 wt % to 20 wt %, with respect to the total weight of the sol.

If the proportion of the silica is less than 5 wt %, the silicate concentration may excessively be low, and thus, the skeleton of the resulting wet gel may have insufficient strength.

On the other hand, if the proportion of silica exceeds 20 wt %, the time required for gelatinization of the sol solution may excessively be short, and thus, may be difficult to control.

<Acids>

For the acid, hydrochloric acid, nitric acid, sulfuric acid, phosphoric acid, acetic acid, citric acid, and the like can be employed.

In consideration of acceleration of the hydrolysis of silicates, sufficient strength of the skeleton of the resulting gel, and the subsequent hydrophobization step, hydrochloric acid is preferably employed.

The concentration of hydrochloric acid is preferably from about 1 N to about 12 N, more preferably from about 6 N to about 12 N.

If the concentration of hydrochloric acid is excessively low, it would require adding a large amount of dilute hydrochloric acid in order to adjust the pH to a desired value, and therefore, the concentration of silicate would be lower, and generation of a silica network may not effectively be progressed.

For industrial production, in consideration of pot life of the silica sol solution, the following method is preferred in order to cause a desirable gelatinization reaction.

A silica sol solution A to which double the required volume of acid has been added, and a silica sol solution B with no acid is prepared in advance.

These silica sol solutions are delivered through separate systems, and are mixed directly above a mold or substrate, and the mold or substrate is coated with the mixture.

(ii) Pouring the Liquid and Gelatinization

The sol in Step (i) is poured into the fiber sheet 26 and is gelatinized.

The silica sol solution A and the silica sol solution B may be mixed in advance, and the mixture solution may be poured into the fiber sheet 26. Then, the fiber sheet 26 may be allowed to stand until the gelatinization has sufficiently progressed.

In order to promote the gelatinization, the fiber sheet may be heated to about 30° C. to about 70° C.

If the temperature is lower than 30° C., it may be difficult to accelerate the gelatinization, and thus, productivity may be impaired.

On the other hand, if the temperature exceeds 70° C., water in the silica sol solution may be vaporized, and thus, the vaporized water would be separated therefrom in the course of the gelatinization reaction. Consequently, a desirable silica aerogel may not be obtained.

<Diameter of Fibers in the Fiber Sheet 26>

Fibers having a diameter smaller than 1 μm may be difficult to obtain, and therefore, economical efficiencies and productivity may be impaired.

If fibers having a diameter larger than about 3 μm are employed, the performance as heat-insulation material may be impaired.

When fibers having an excessively large diameter are used, the fibers themselves serve as a heat path, and therefore, such fibers are not suitable.

Since the fibers are employed for the purpose of heat-insulation in the first embodiment, the fibers preferably have a smaller diameter.

Additionally, although use one type of fibers is described in the first embodiment, the disclosure is not limited to such an embodiment, and therefore, multiple types of fibers may be mixed.

<Materials of Fiber Sheet 26>

With regard to a material of the fibers, glass fibers are employed in this embodiment. However, the disclosure is not limited thereto. Other types of fibers such as polymer-type fibers, carbon fibers, ceramic fibers, metal fibers, plant-derived fibers, and mineral-based fibers may be employed.

(iii) Aging

Subsequent to Step (ii), it is required that polycondensation of silica particles, and growth of secondary particles are promoted, in order to secure strength of the fiber sheet 26 sufficient to withstand capillary forces generated during the drying process.

After the gelatinization, the compact is aged at about 0° C. to about 100° C., preferably about 60° C. to about 90° C., where water in the compact is not vaporized, and thus, polycondensation of silica particles, and growth of secondary particles are promoted.

If the aging temperature is below 60° C., a required amount of heat may not be conveyed to the silicates, and thus, the growth of silica particles may not sufficiently be promoted. Consequently, it may take a long time until the aging process is sufficiently progressed. Also, the resulting gel may be low strength, and may significantly be shrunken during the drying process. As a result, a desirable silica aerogel may not be obtained.

Furthermore, if the aging temperature exceeds 90° C., approaching 100° C., water present in the compact is vaporized, and thus, a phenomenon in which the water is separated from the gel may be observed. Consequently, the volume of the resulting gel may be reduced, and thus, a desirable silica aerogel may not be obtained.

Additionally, the humidity throughout the aging process is preferably adjusted to 70% or higher so as not to easily cause vaporization of water in the compact during the aging process.

Although the aging time depends on the aging temperature, and the thickness of the compact, the aging time is preferably from about 3 minutes to 24 hours.

If the aging time is shorter than 3 minutes, sufficient improvements in the strength of wall of the gel may not be achieved.

If the aging time is longer than 24 hours, effects to improve the strength of the wall of the gel brought about by the aging process may become poor, and thus, productivity may be impaired.

(iv) Hydrophobization (Soaking in Hydrochloric Acid)

In the hydrophobization step, hydrophilic hydrogels are caused to react with hydrophobization agents to produce hydrophobic gels.

This hydrophobization step is divided mainly into two substeps.

The first substep is a step for causing hydrochloric acid to penetrate into the pores of the aged hydrogel.

Unless hydrochloric acid is not caused to penetrate into all of the pores of the hydrogel, a desired reaction may not be caused, and thus, a hydrophobization treatment may not be completed in the subsequent second substep. Consequently, a hydrophilic aerogel may partially be produced.

Unless hydrophobization is not complete throughout an area from the surface to the inside of the aerogel, desirable heat-insulation performance will not be obtained.

The concentration of hydrochloric acid is preferably from about 3 N to about 12 N.

If the concentration of hydrochloric acid is 1 less than 3 N, such a concentration is excessively low, and thus, a concentration of an active species that is a reaction product of siloxane is low. Consequently, a hydrophobization in Step (v) (silylating step) may not sufficiently be progressed.

Hydrochloric acid with a concentration higher than 12 N is not industrially produced, and therefore, is difficult to obtain.

Furthermore, an amount of hydrochloric acid is not particularly limited as long as it makes it possible for the hydrogel to sufficiently soak therein. However, about two to one hundred times the amount of hydrochloric acid to the hydrogel may be preferable.

If an amount of hydrochloric acid is smaller than double the volume of hydrogel, such a concentration of hydrochloric acid may be excessively low, and thus, a concentration of an active species that is a reaction product of siloxane is low. Consequently, a hydrophobization in Step (v) (silylating step) may not sufficiently be progressed.

Furthermore, if an amount of hydrochloric acid is larger than one hundred times the volume of hydrogel, such an amount may be excessive, and therefore, productivity may be impaired.

With regard to conditions for soaking in hydrochloric acid, the temperature of hydrochloric acid solution is preferably from about 0° C. to about 50° C., and the soaking time is preferably from about 30 seconds to about 72 hours.

If the temperature of the hydrochloric acid solution is below 0° C., and the soaking time is shorter than 30 seconds, hydrochloric acid may not sufficiently be caused to penetrate into the pores of the hydrogel.

If the temperature of the hydrochloric acid solution is higher than 50° C., and the soaking time is longer than 72 hours, productivity may be impaired.

(v) Hydrophobization (Silylation Treatment)

In the second substep (silylation treatment) for the hydrophobization, an active species produced through a reaction between hydrochloric acid that has penetrated into the pores of hydrogel, and a hydrophobization agent is caused to react with a silanol present on the surface of silica.

Unless the reaction between the hydrochloric acid and the hydrophobization agent is completed, the hydrophobization treatment is incomplete. Therefore, a hydrophilic aerogel will partially be produced.

Unless the hydrophobization is completed throughout an area from the surface to the inside of the aerogel, desirable heat-insulation performance will not be obtained.

In the first embodiment, the hydrophobization agent is a linear or ring siloxane.

At least one type of such a siloxane is employed as the hydrophobization agent, and a hydrophobization reaction is carried out in a mixture solvent of an alcohol and the hydrophobization agent.

As examples of linear siloxanes, octamethyltrisiloxane, decamethyltetrasiloxane, dodecamethylpentasiloxane, and the like can be mentioned.

When the above linear siloxanes are reacted with hydrochloric acid, a trialkylchlorosilane, and a dialkyldichlorosilane are produced. Also, water is simultaneously produced as a byproduct.

As examples of ring siloxanes, hexamethylcyclotrisiloxane, octamethylcyclotetrasiloxane, decamethylcyclopentasiloxane, and the like can be mentioned.

When the above ring siloxanes are reacted with hydrochloric acid, a dialkyldichlorosilane and a dialkyldichlorosilane are produced. Also, water is simultaneously produced as a byproduct.

An amount of a linear or ring siloxane that serves as a hydrophobization agent is preferably from about 100% to about 800%, more preferably about 100% to about 300%, with respect to a volume of the pores of the hydrogel.

If the amount of hydrophobization agent is smaller than 100% with respect to the volume of the pores of the hydrogel, silanols (Si—OH) present on the surface and the inside of the hydrogel may be unreacted and remain.

In that case, due to capillary forces generated during the drying step, silanols may physically come into contact with each other, thereby causing a dehydration/condensation, and this may lead to shrinkage/high densification of the gel.

If the amount of hydrophobization agent is larger than 800% with respect to a volume of the pores of the hydrogel, an excessive amount of the hydrophobization agent may be present compared with a minimal amount of the hydrophobization agent to be reacted with silanols, and thus, economic efficiencies and productivity may be impaired.

The hydrophobization reaction may be carried out in a solvent, as needed. In general, the reaction may be carried out at about 20° C. to about 100° C., preferably at about 40° C. to about 80° C.

If the reaction temperature is lower than 20° C., diffusion of the hydrophobization agent may be insufficient, and thus, the hydrophobization may not sufficiently be achieved.

If the reaction temperature exceeds 100° C., the hydrophobization may easily be vaporized, and a silylating agent that is required for the reaction may not supplied to the outside and the inside of the hydrogel.

Simultaneously, an acid solution discharged therefrom with the progress of the hydrophobization reaction may be boiled, and problems may be developed with safety.

As long as the reaction temperature is from about 40° C. to about 80° C., the hydrophobization agent quickly diffuses, and therefore, the reaction is sufficiently progressed. As a result, with the progress of the hydrophobization reaction, the discharged acid aqueous solution will not boil, and thus, a safe work environment can be secured.

As preferable examples of usable solvents, alcohols such as methanol, ethanol, 2-propanol, 1-butanol, and 2-butanol; ketones such as acetone, and methylethylketone; linear hydrocarbons such as pentane, hexane, and heptane can be mentioned.

While the hydrogel is solid and hydrophilic, the hydrophobization agent is liquid and hydrophobic. Thus, these materials are not easily mixed, and the reaction takes place as a solid-liquid heterogeneous system reaction. Therefore, in order to cause reaction active species to efficiently react with the hydrogel, use of alcohols or ketones, which are amphiphatic solvents, is preferable, and use of alcohols is more preferable.

The soaking for the silylation treatment is preferably about 3 minutes to about 72 hours.

To confirm an end point of the reaction, the end point may be determined by observing that discharge of the acid aqueous solution from the hydrogel has plateaued with the progress of the hydrophobization reaction.

If the soaking time is shorter than 3 minutes, the silylating agent required for the reaction may not be supplied to the exterior and the inside of the hydrogel, and thus, the reaction may insufficiently be progressed.

If the soaking time exceeds 72 hours, productivity may be impaired.

(vi) Drying

In the drying step, the liquid solvent inside the hydrophobized gel obtained in the previous step is vaporized.

A drying technique used herein is not particularly limited, and any known drying techniques such as supercritical drying methods, and non-supercritical drying methods (e.g., ordinary-pressure-drying methods, and freeze-drying methods) may be employed.

In order to realize mass production, sufficient levels of safety and economic efficiencies, use of ordinary-pressure-drying methods, i.e., one type of non-supercritical drying methods, is preferable.

The drying temperature is not particularly limited as long as the gel is tolerable to it. However, if the gel is rapidly heated, the solvent inside the gel may bump, and thus, large cracks may be caused in the produced silica aerogel.

If cracks are caused in the silica aerogel, heat transmission due to occurrence of air convection therein may be caused. Consequently, the heat-insulation properties may significantly be impaired. Also, the silica aerogel may become powdery, thus significantly deteriorating the handleability or workability. The occurrence of these adverse phenomena depends on the size of the cracks.

In the drying step, for example at or below ordinary pressures, the gel is preferably dried at 0° C. to 400° C. for 0.5 to 5 hours.

If the drying temperature is below 0° C., a required length of drying time may be long, and thus, productivity may be impaired.

On the other hand, if the drying temperature exceeds 400° C., dialkyldisiloxane bonds, or cross-link-type disiloxane bonds in the hydrophobic aerogel may be released due to thermal decomposition, and thus, the resulting gel may become a hydrogel not having hydrophobicity.

In addition, in cases where hydrophobic aerogels are produced in such a manner that they are combined with substrates such as polymer-based fibers, or unwoven fabrics, the gels are preferably dried at about 200° C. or lower (i.e., at a temperature that is below melting points of the substrates).

<Crushing Step>

The fiber sheet 26 produced in the above-described way is crushed into small fragments of fiber sheets 22.

That is, the state depicted in FIG. 2A is converted to the state depicted in FIG. 2B.

The fiber sheet 26 can be pulverize with a mixer.

Alternatively, the fiber sheet 26 may be placed on an elastomer, and then, a blade may be pushed against the fiber sheet 26 from the upper direction so as to cut it into small pieces of fiber sheets 22.

<Covering Step>

The above fiber sheets 22 are covered with a covering material 21.

That is, the state depicted in FIG. 2B is converted to the state depicted in FIG. 2C.

Multiple fiber sheets 22 are placed on one piece of covering material 21, another piece of covering material 21 is further placed thereon, and then, peripheral areas are fused.

The peripheral area may be sealed with a tape, adhesive, or the like.

Furthermore, the top and bottom covering materials 21 may be fused not only in the peripheral areas but also at certain points or in dot-like patterns within an internal area.

(Second Embodiment): Elastic Material

Figure 4:
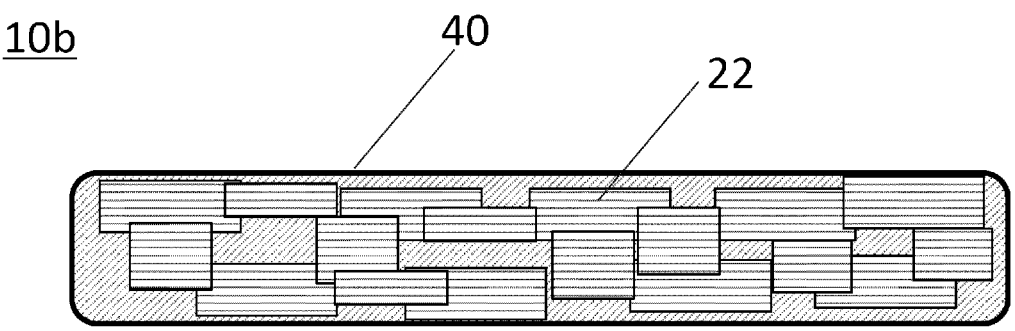
FIG. 4 is a cross-section view of a heat-insulation material according to a second embodiment.

FIG. 4 refers to a heat-insulation material 10b according to the second embodiment.

Matters not mentioned in this embodiment are the same as those mentioned in the first embodiment.

In the heat-insulation material 10b, fiber sheets 22 are embedded in an elastic material 40.

In the first embodiment, the fiber sheets 22 are covered with the covering materials 21. However, in the second embodiment, the fiber sheets 22 are penetrated into the elastic material 40.

For example, fiber sheets 22 may be put into a toluene solution of a one-component acetic-acid-type silicone rubber.

Then, the solution may be cured in the atmosphere.

As a result, a rubber elastic material having excellent properties such as heat resistance, low-temperature resistance, weather resistance, adhesiveness, and electric insulation properties will be produced.

A preferred type of the elastic material 40 depends mainly on a temperature of heat generated by the heat source 110 employed herein.

In cases where the heat source reaches a maximum temperature of about 90° C., natural rubbers may be employed. In cases where the heat source reaches a maximum temperature of about 120° C., chloroprene rubbers, or nitrile butadiene rubbers may be employed.

In cases where the heat source reaches a maximum temperature from about 200° C. to about 300° C., silicon rubbers, or fluoro-rubbers may be employed.

(Third Embodiment): Electrically-Conductive Sheets

Figure 5:
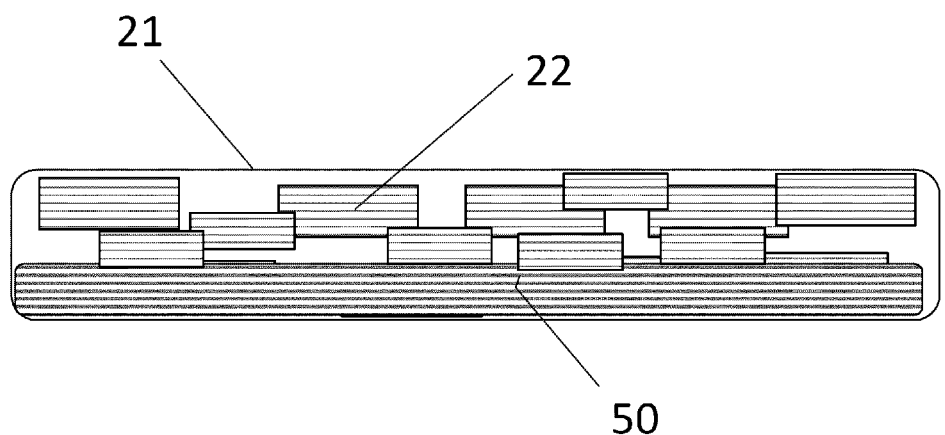
FIG. 5 is a cross-section view of a heat-insulation material according to a third embodiment.

FIG. 5 refers to a heat-insulation material 10c according to the third embodiment.

Matters not mentioned in this embodiment are the same as those mentioned in the first embodiment.

In the heat-insulation material 10c, fiber sheets 22 and an electrically-conductive material 50 are covered with a covering material 21.

While only the fiber sheets 22 are provided in the first embodiment, the electrically-conductive material 50 is further provided in the third embodiment.

For the electrically-conductive material 50, for example, a graphite sheet may be employed.

In particular, a graphite sheet produced by sintering a polyimide film is preferably employed therefor.

Since the electrically-conductive material 50 is embedded in the heat-insulation material 10c, homogenization of heat becomes possible.

As a result, homogenization of heat, and heat insulation realized by the fiber sheets 22 are simultaneously achieved.

In particular, in cases where variations in the temperature are caused on parts of the heat source 110, homogenization of heat over the heat source and heat-insulation can be achieved.

Not only heat insulation but also heat homogenization are carried out, thereby realizing efficient heat insulation.

Fourth Embodiment

Figure 6:
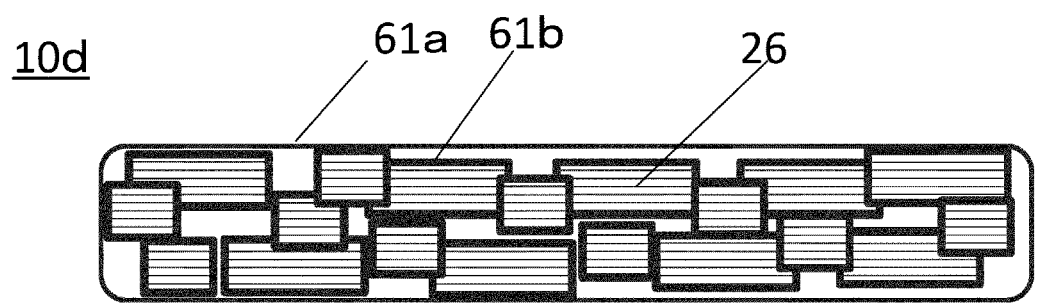
FIG. 6 is a cross-section view of a heat-insulation material according to a fourth embodiment.

FIG. 6 refers to a heat-insulation material 10d according to the fourth embodiment.

Matters not mentioned in this embodiment are the same as those mentioned in the first to third embodiments.

In the heat-insulation material 10d, each of fiber sheets 26 including aerogels is covered with a second covering material 61b.

Furthermore, multiple fiber sheets 26 are covered with a first covering material 61a.

A shape of each of the fiber sheets 26 including aerogels protected by the second covering material 61b, and thus, the entire body of the heat-insulation material 10d will have improved strength.

In the same manner as the second embodiment, the fiber sheets 26, each of which is covered with the second covering material 61b may be included in an elastic material 40.

Furthermore, in the same manner as the third embodiment, an electrically-conductive material 50 may be included in the heat-insulation material 10d.

The production process for this embodiment is basically the same as the production process for the first embodiment. In advance, a fiber sheet is crushed into small pieces, and each of the pieces is covered with the first covering material. Then, the resulting small pieces of fiber sheets, each of which is covered with the first covering material, are covered with a second covering material in the same manner as the covering step in the first embodiment.

(As a Whole)

The above embodiments can be combined.

Since materials obtained by putting aerogels into fibers are used for the fiber sheets 22, not only large heat-insulation areas but also sufficient strength can be obtained unlike cases where only aerogels are employed.

Shapes of heat-insulation materials according to the disclosure can be varied in three dimensional manners, and therefore, makes it possible to achieve improved heat-insulation performance with respect to heat-related objects having various shapes. Accordingly, the heat-insulation materials according to the disclosure can be employed for the purposes of heat insulation in various types of electronic devices, houses, vehicles, clothing, etc., and thus, are industrially useful. The heat-insulation materials are lightweight, and it is good when used for clothing.

What is claimed is:

1. A heat-insulation material, comprising:
   a plurality of fiber sheets having different sizes from each other, wherein each of the plurality of fiber sheets includes fibers and an aerogel;
   a first covering material that encloses the plurality of fiber sheets; and
   an electrically-conductive material, wherein the electrically-conductive material is enclosed by the first covering material, wherein the plurality of fiber sheets are stacked forming at least three layers on the one electrically-conductive material, and the plurality of fiber sheets only partially overlap with each other when viewed in a normal direction of a surface of the electrically-conductive material.

2. A heat-insulation structure, comprising:
   a heat source; and
   a heat-insulation material that is placed around the heat source so as to cover at least one corner of the heat source,
   wherein the heat-insulation material comprises a plurality of fiber sheets, wherein each of the plurality of fiber sheets includes fibers and an aerogel, and the plurality of fiber sheets have different sizes from each other, and
   wherein an entirely of the plurality of fiber sheets is further enclosed by a first covering material, the plurality of fiber sheets are located in parallel with external surfaces of the heat source, and in corner part of the heat source, the plurality of fiber sheets cover the corner part without bending.

* * * * *